United States Patent [19]

Gorman, Jr. et al.

[11] 4,200,611
[45] Apr. 29, 1980

[54] DISTRIBUTION DEVICE

[75] Inventors: William W. Gorman, Jr.; Esther M. Gorman, both of Treasure Island, Fla.

[73] Assignee: E-C Apparatus Corporation, St. Petersburg, Fla.

[21] Appl. No.: 919,099

[22] Filed: Jun. 26, 1978

[51] Int. Cl.² .............................................. B01D 11/00
[52] U.S. Cl. ..................................... 422/258; 422/256
[58] Field of Search ........................ 422/256, 258, 259

[56] References Cited

U.S. PATENT DOCUMENTS

| Re. 25,186 | 6/1962 | Raymond | 422/256 |
|---|---|---|---|
| 2,224,392 | 12/1940 | Imes | 214/23 |
| 3,189,414 | 6/1965 | Beau | 422/256 |

FOREIGN PATENT DOCUMENTS

| 1078088 | 3/1960 | Fed. Rep. of Germany | 422/259 |
|---|---|---|---|
| 1349196 | 5/1964 | France | 422/256 |
| 45-34931 | 9/1970 | Japan | 202/262 |

OTHER PUBLICATIONS

Wilhelm, Harley A., et al., "A Counter Current Liquid–Liquid Extractor," Industrial and Eng. Chem., vol. 91, No. 5, May 1959, (pp. 633–636).

*Primary Examiner*—R. E. Serwin
*Assistant Examiner*—Chris Konkol
*Attorney, Agent, or Firm*—Sughrue, Rothwell, Mion, Zinn and Macpeak

[57] ABSTRACT

A device for mixing immiscible or semi-immiscible liquids and subsequently separating one or more of them followed by transfer is disclosed. An array of elements is utilized with the center decant transfer tube of one element connecting with the mixing tube of the adjacent element to the right. This is used for transfer of the upper phase material, generally known as the effluent phase. Transfer of the lower phase or the residual phase is accomplished by transferring to the mixing tube indicated to the left in the array. The upper phase is first decanted through a center decant tube, and then, prior to mixing, the lower phase is transferred. The sequence of transfer can be reversed if the units are stacked so that movement proceeds in opposite directions in adjacent rows of elements. The lower phase transfer tube is purposefully canted downward, and a two-speed rotation motor may be used in order to convert the system from a counter-double-current distribution system to a standard counter-current distribution device. This is accomplished by quickly passing the lower phase decant, thereby retaining the lower phase in the same tube.

3 Claims, 10 Drawing Figures

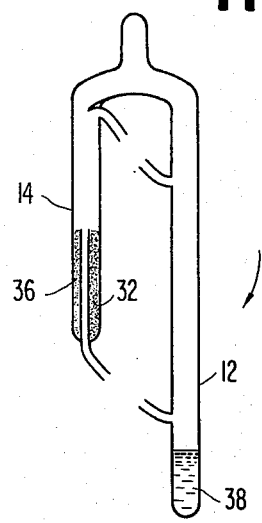
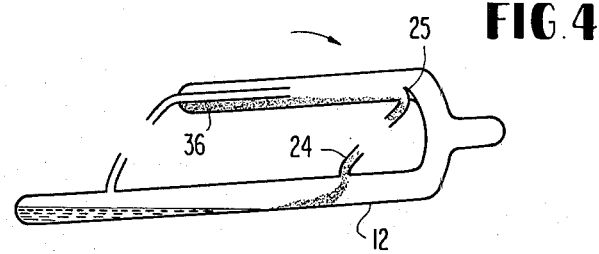
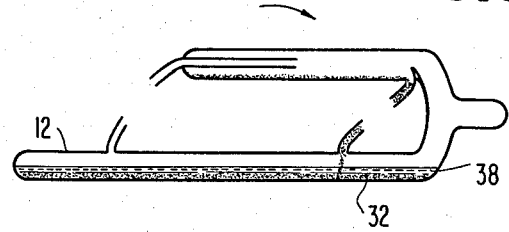
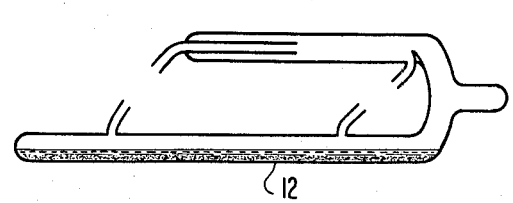
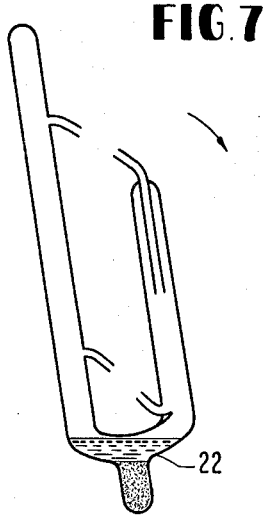
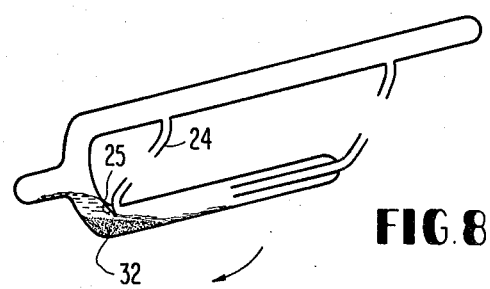
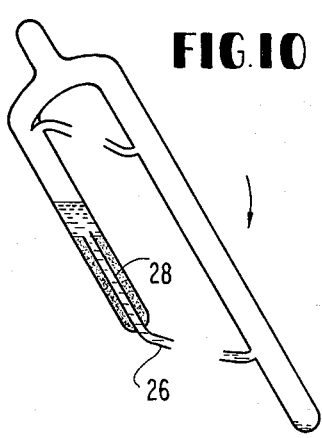
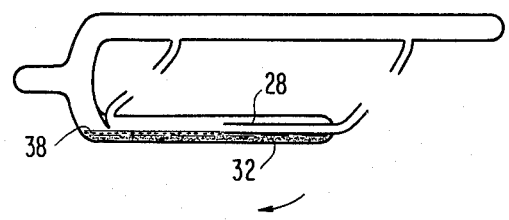

DISTRIBUTION DEVICE

BACKGROUND OF THE INVENTION

This invention relates to a chemical apparatus for mixing immiscible or semi-immiscible fluids.

Techniques of extraction for separation of materials have been the subject of much experimentation. It is well established that conventional funneling techniques will not, on a single extraction pass, suffice for the separation of similar substances. Within this technology, a technique, "countercurrent distribution" (CCD), has been developed to utilize small differences in partitioning properties for purification purposes by repetitive contacting extraction passes. A hallmark of CCD is that the distribution of solute in the train can be mathematically predicted, thereby providing a model for defining the purity of the isolated product. The theory is set forth in King and Craig, "Countercurrent Distribution," Methods of Biochemical Analysis, Volume 10, page 201.

Devices built for CCD usually consist of a series of interconnected glass tubes so configured that in each tube an upper (effluent) phase can be mixed with a lower (residual) phase, allowed to separate from the lower phase and then automatically transferred to the next tube in the series while leaving the lower phase behind. These devices operating on a stepwise transfer basis allow precise fractionation of complex mixtures even in cases where only small amounts of material are available.

As indicated in a CCD train, only one phase, usually the upper phase, is transferred, and the other remains stationary in each element of the train. An important modification of CCD has been developed in which both phases move at a predicated and controlled rate through the train. This is known as "counter-double-current distribution" (CDCD). This technique is important because it allows a fresh portion of the sample to be introduced at a central point in the array on each transfer. CDCD mathematical distribution theory has been reported in Post and Craig "A New Type of Stepwise Countercurrent Distribution Train," 35 Anal. Chem. 641 (1963). In CDCD, two distribution techniques are available: (1) upper stage transfer in one direction on every other equilibration stage while lower stage transfer takes place in an opposite direction on intervening transfers, and (2) both stages are transferred to an adjacent tube, in opposite directions on each equilibration.

Within the prior art, a variety of such devices have been reported which are used for CCD or CDCD solvent phase extraction. Typical are U.S. Pat. Nos. 2,892,688, 2,895,808 and 2,973,250. Additionally, the technical literature is replete with reports of experimental devices used in a CCD mode. Typical are Gaucher, "An Introduction to Chromatography," Volume 46, J. Chem. Ed. 729 (1969), Alderweireldt, "New Instrument for Continued Batch Wise Separation by Extraction," Analytical Chemistry 30, 1290 (1961), and Hietala, "A Counter-Current Distribution Method," Ann. Acad. Scient. Fennicae, A.I.I. 100 at page 13.

More pertinent prior art appears in the Post and Craig article, which shows an apparatus utilizing the technique practicing the first technique of CCD set forth above using side-arm decantation of the upper phase. This technique, however, leads to co-flow. This type of system has not achieved wide commercial success because the tubes of the apparatus are individually constructed, which require a large number of joints. By having so many joints between system components, the propensity for leakage is increased. Also, the device of Post and Craig requires operation in two directions, therefore, necessitating a complicated drive train.

A device which has achieved a commercial success in the practice of CCD is described by Raymond, "Compact CounterCurrent Distribution Apparatus," Analytical Chem. 30, 1214 (1958). This device is also explained in detail in U.S. Pat. No. Re. 25,186 to Raymond.

The Raymond device shows best in FIGS. 1 and 2 a system which is mounted for rotation about bearing 19 having a number of mixing and separating elements 14. The elements are constructed as common elements individually shown in FIGS. 2 and 5. Each of the elements contains a mixing phase tube 34 and a phase separating tube 35. The tubes are coupled by a common bifurcated juncture 36 shown best in FIG. 3. Shown in FIG. 3, the mixing tube has a closed end 37 with a cap 38, and an effluent phase entrance tube couples the tube 34 to the phase separating tube 35 via down spout 51.

In operation of the Raymond device, each of the elements 14 are filled with a predetermined amount of lower (residual) phase material equal to the volume which can be retained between the down spout element 51 and the lower septum wall 50. This is generally known as the critical volume. A quantity of the effluent or upper phase is introduced generally, while the elements are in the horizontal position with the reservoir 49 disposed upwardly. The quantity of the effluent phase is not critical but limited only to the capacity of the mixing tube 34. Operation commences with the phase separating tube 35 disposed above the mixing tube 34 with the elements 14 rocked to thoroughly mix the effluent and residual phases. The elements are then rotated 180° into the position shown in FIG. 4 of the Raymond device such that the intermixed contents are allowed to flow into the separating tube 35. Because of the relatively large area of the separating phase tube, separation occurs, and a quantity of the effluent phase may enter the down spout 51. However, none of the critical residual phase will be drained.

The 90° rotation then takes place with the residual phase trapped in the reservoir 49, as shown in the Raymond patent, and the separated effluent phase will pass through the down spout 51 into the drain tube 53 with this action. The effluent phase is deposited in the next adjacent element 14 so that on the next rotational cycle the second extraction can be performed.

SUMMARY OF THE INVENTION

This invention is a direct improvement of the device described in the Raymond U.S. Pat. No. Re. 25,186 for CCD and of the CDCD device described by Post and Craig in Analytical Chem. 35, 641 (1963). The present invention is both a CDCD device and a CCD device. In a CCD device such as in the Raymond patent, only one phase is transferred. This is clearly shown in the patent, for example, in schematic drawings 7a-7e. The other phase remains stationary in the distribution chain. In contrast, in a CDCD device, both phases move at a controlled rate through the train in opposite directions, either on an alternate basis or simultaneously on each equilibration, depending on the technique practiced. However, no one device appears to be capable of practicing both CCD and CDCD. The present invention utilizes the technique of center decantation known in CCD in the context of a CDCD device. The Raymond patent, for example, does not perceive the concepts of CDCD, and the most relevant rior art in CDCD, Post and Craig, requires side-arm decantation of the upper phase as opposed to a center decantation. Also, this prior art technique practices simultaneous transfer, requiring a more complicated system. Accordingly, the prior art CDCD devices have problems with co-current flow. Additionally, as shown in the prior art articles, the tubes used in Post and Craig are individually constructed, requiring a considerable number of joints in a system having a large number of tubes.

The present invention utilizes a novel tube design which allows stacking and unitary construction, thereby eliminating the necessity for a large number of joints. Each bank may be stacked in a compact apparatus for rotation in a single direction.

The present invention therefore overcomes another deficiency in the prior art by having an apparatus which rotates in a single direction only as opposed to one requiring an oscillating drive train.

The invention having the ability to be stacked minimizes external temperature influences. Prior art devices such as shown by Post and Craig are also susceptible to a temperature variance across the device since the array is relatively long which can alter the equilibrium of the phases enough to distort the double flow characteristics of the two phases. Accordingly, it is exceptionally important to have an apparatus which is temperature controlled, and this can be more easily accomplished in a design which is compact.

The present invention utilizes a novel tube design which accomplishes CDCD in a manner by which the tube array may be stacked and used on a prior art rotation mechanism, such as a portable base as shown in FIG. 1 of the Raymond patent.

The novel tube construction of this invention utilizes a center decant tube having a center decant tube connecting with a mixing tube for transfer of the upper phase in one direction, while the other phase may be transferred in the opposite direction by a second decant tube.

Moreover, the present invention can be converted from CDCD to standard CCD by simply utilizing two-speed rotations such that higher speed lower phase decantation is a bypass, thereby retaining the lower phase within the same tube. This versatility of operation is facilitated by means of a lip element which is placed in the center tube decant section.

Accordingly, it is an object of this invention to define a device which accomplishes a CDCD by rotation in a single direction.

It is yet another object of this invention to provide a novel construction which is capable of both a CDCD as well as a CCD.

Still another object of this invention is to define an apparatus which is of compact construction and minimizes the number of joints between elements, thereby minimizing leakage.

These and other objects of this invention will become apparent from the description of the preferred embodiment of the drawings which follow.

BRIEF DESCRIPTION OF THE DRAWINGS

FIGS. 3-10 are schematic views showing the operation of the device.

DESCRIPTION OF THE PREFERRED EMBODIMENT

Figures 1, 2:
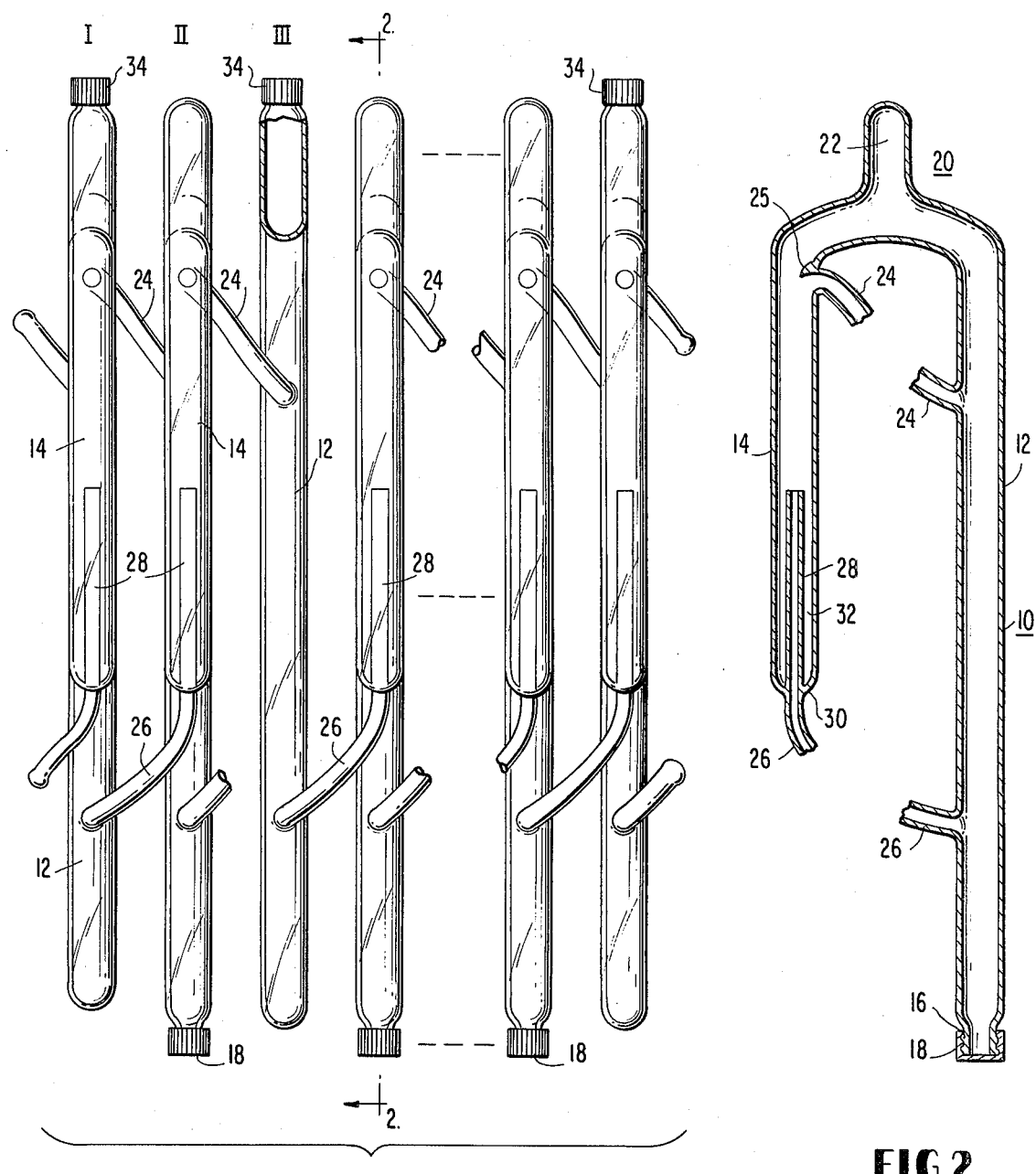
FIG. 1 is a front view of an array of tube elements showing the tube connections.
FIG. 2 is a side view of one particular tube.

Referring to FIGS. 1 and 2, the basic systematic tube elements are shown. It is understood that the tubes may be mounted in a convenient portable base-like member for rotation in a single direction, for example, as shown in the Raymond U.S. Pat. No. Re. 25,186, FIG. 1. Accordingly, the description of the preferred embodiment will be constrained to a description of the novel tube construction, it being understood that the tubes may be mounted in any convenient rack-like member in a stacked configuration for rotation.

As shown in FIGS. 1 and 2, the individual tube elements 10 generally comprise a mixing tube section 12 and a center tube decant section 14. The mixing leg 12 has at its lower end a threaded section 16 with a filler cap 18 operably screwed into place. In practice, caps are placed as shown in FIG. 1 at opposite alternating ends of the elements. As in the case of the Raymond patent, it is understood that the upper phase, that is, the lighter phase, is generally known as the effluent phase, while the lower phase, that is, the heavier phase, is generally known as the residual phase. The mixing tube and decant section are joined together by means of a juncture point 20 having a distended volume area 22. If necessary, a cap may be placed at the tip of volume 22. A residual phase coupling 24 is used to couple the decant tube of one section to a mixing tube on the right. The transfer tube 24 allows the transfer of the lower or residual phase to mixing tubes in a direction moving to the right as shown in FIG. 1. As will be explained herein, operation is reversible depending on the stacking arrangement. If the elements are stacks, the phases will move in opposite directions along opposite courses to effectuate continuous transfer throughout the series.

A second juncture tube 26 provides a tube coupling from the center decant tube with a mixing tube having a juncture segment 26 to the left for transfer of the upper phase or effluent phase in a direction to the left as shown in FIG. 1.

As shown in FIG. 2, a lip member 25 is provided in the decant section to aid in the direction of flow of the lower phase.

FIG. 2 shows the coupling of the juncture tube 26 to a down spout element 28 located in the center decant section 14. The septum element 30 together with the sidewalls of down spout element 28 and the circumferential walls of the decant section define a critical volume 32 for the lower phase.

As shown in FIG. 1, the lower phase transfer tube 24 is canted in the downward direction. This allows a conversion of the device to a standard CCD apparatus by speeding up rotation. This technique will be explained herein during a discussion of operation of the device.

As shown in FIG. 1, end caps 34 are provided on "odd" elements, while end caps 18 are mounted on "even" elements at the bottom of those elements. This facilitates filling and discharge.

Referring now to FIGS. 3-10, the operation of the device in a CDCD type one mode will be described. That is, transfer is effectuated in an opposite direction on alternate equilibrations. For purposes of describing the operation, it is assumed that as shown in FIG. 3 a lower phase material is retained in the center decant tube section 14 within the critical volume 32. The lower phase material is shown in FIG. 3 with the appropriate identifying hatching as material 36. The upper phase 38 is already retained, having been transferred into the mixing leg 12 from a tube directly adjacent to its left. Given that starting equilibration point, the device is rotated clockwise 90° in a manner shown in FIG. 4.

In FIG. 4, the rotation of the apparatus through 90° results in an orientation as shown. Rotation can be effectuated in any manner utilizing a rack mounting coupled to a motor, for example, as shown in the Raymond U.S. Pat. No. Re. 25,186.

As the rotation takes place, the lower phase will be decanted to the next element via lower phase transfer tube 24. Hence, transfer of the lower phase takes place in the system while the upper phase remains in place. The lip member 25 is used to guide the direction of the flow of the lower phase through the transfer tube 24 into the mixing leg 12. It is understood that, although one tube is shown, a rotation from FIG. 3 to FIG. 4 will be effectuated simultaneously for all tubes in the array so that a simultaneous decantation will take place into a consecutive number of mixing tubes.

FIG. 5 shows the continued decantation of the lower phase such that, as shown in FIG. 5, the lower phase material 32 will settle below the upper phase material 38 retained evenly in the mixing tube element 12. FIG. 6 shows the completion of decantation of the two phases which may now be mixed in the standard fashion by rocking the tube section back and forth through a very small angle. This is schematically shown in FIG. 6 by means of the arrow as indicated. A gentle mixing takes place, and, as shown in FIG. 7, by continued rotation of the tube, the two phases will flow together and settle in the juncture element 22.

Referring now to FIG. 8, it can be seen that by further rotation in the counterclockwise direction, decantation towards the settling phase takes place. The lower phase is constrained within a corner of the apparatus, and lip element 25 is effective to prevent the passage of lower phase material into the transfer tube 24.

As shown in FIG. 9, the apparatus is rotated into a resting position where settling takes place of the two phases. As shown, a portion of the upper phase 38 may lie adjacent to the down spout element 28 while the lower phase 32 is constrained at a liquid level below the opening of member 28. Because upper phase decantation is the next step, the liquid level of the upper phase is irrelevant so long as the lower phase is constrained by initial critical volume measurements to lie below the entry port of the down spout element 28.

FIG. 10 shows the final step where the apparatus is brought into the vertical position for upper phase decantation. The upper phase will decant from down spout member 28 through upper phase transfer tube 26 to effectuate decantation to the left. The lower phase remains constrained in the critical volume 32 so that only upper phase transfer is effectuated during this resting position. It is readily apparent that the transfer tube 26 in one tube will join with the upper phase transfer tube section 26 of the tube immediately adjacent to effectuate upper decantation to the left as shown in FIG 2. The apparatus is then returned to the configuration as shown in FIG. 3, with the critical volume 32 having contained therein the lower phase material 36, and a complete cycle of CDCD has been completed.

As can be seen, accordingly, the lower phase material 36 is decanted to the right via transfer tube member 24 in one step, and upper phase material is decanted to the left in a subsequent step.

It is understood that the tube connections 24 and 26 could be reversed to cause lower phase decantation to the left and upper phase to the right. If the elements are stacked to compact the space needed, decantation of one phase would move in one direction in one row, then drop to the next row where it would move across the array in a direction opposite to that in the row above. This would allow decantation through a stacked system. Hence, although the example shows decantation of the lower phase to the right, by reversal of connections in an adjacent course, the path would be reversed. The same would obviously be true for the upper phase.

With this construction, a bank of tubes can be constructed such that each one would make the necessary connections, having transfer tube 24 coupled to the tube immediately to the right, as shown in FIG. 2, for transferring lower phase to the right, and having a transfer tube section 26 coupled to the tube immediately to the left for transferring the lower phase to the left. Accordingly, with constant rotation, banks of tubes can be constructed and stacked in a back-to-back manner to practice CDCD.

As shown by the mode of operation, extraction takes place in a manner similar to that theoretically defined for CDCD in the sense that the upper and lower phases of adjacent tubes will not contact each other during transfer operations and pass in different directions. Hence, as shown in FIGS. 1 and 2, the lower phase from, for example, tube II will be transferred to the right to tube III and will come in contact with upper phase material from tube IV. The lower phase from tube III would be transferred to the left into tube II and would contact the upper phase material from tube I.

As can be appreciated, a CDCD is effectuated with this system by rotation in a single direction. Also, because side-arm decantation is not used, the possibility of co-current flow of the various phases is avoided.

Additionally, the apparatus is capable of operation in a standard CCD mode. This operation is possible because the lower phase transfer tube 24 is purposefully canted in a downward direction as shown in FIG. 2. If, for example, a two-speed rotation motor is used at a higher speed, rotation from FIG. 3 180° to FIG. 7 will bypass lower phase decantation, thereby retaining the lower phase in the same tube. During this higher speed rotation, the lip element 25 will prevent any back-flow of a lower phase material into the transfer tube 24 and retain it in a manner generally shown in FIG. 7. Accordingly, by use of higher speeds, the system is capable of conversion into standard CCD operation in which only the upper phase is transferred.

It is readily apparent that modifications and changes to this system may be made without departing from the essential scope and teachings of this invention.

We claim:

1. A tube element adapted for interconnection in a rotatable array of such elements to implement the mixing and separating of two at least semi-immiscible liquids, comprising:
   (a) an elongated hollow mixing tube (12) closed at a lower end,
   (b) an elongated hollow decanting tube (14) shorter than the mixing tube and disposed spaced from but parallel thereto with the upper ends of both tubes at substantially the same level, (c) a fluid communicating juncture tube (20) coupling the open upper ends of the mixing and decanting tubes, (d) an elongated downspout tube (28) sealingly mounted in the lower end (30) of the decanting tube and extending upwardly therein a predetermined distance for defining the volume of a lower phase, (e) a first transfer tube (26) coupled at one end to a lower end of the downspout tube and adapted to be coupled at its other end to a lower portion of a mixing tube of an adjacent element on one side in the array, and (f) a second transfer tube (24) coupled at one end to an upper portion of the decanting tube below the juncture tube and above the level of the downspout tube and having a lip (25) above the juncture between the second transfer tube and decanting tube and below the juncture tube and adapted to be coupled at its other end to an upper portion of a mixing tube of an adjacent element of another, opposite side in the array.

2. An array of mixing and separating two at least semi-immiscible liquids comprising a plurality of interconnected tube elements, each of said elements comprising:

(a) an elongated hollow mixing tube (12) closed at a lower end, (b) an elongated hollow decanting tube (14) shorter than the mixing tube and disposed spaced from but parallel thereto with the upper ends of both tubes at substantially the same level, (c) a fluid communicating juncture tube (20) coupling the open upper ends of the mixing and decanting tubes, (d) an elongated downspout tube (28) sealingly mounted in the lower end (30) of the decanting tube and extending upwardly therein a predetermined distance for defining the volume of a lower phase, (e) a first transfer tube (26) coupled at one end to a lower end of the downspout tube and coupled at its other end to a lower portion of a mixing tube of an adjacent element on one side in the array, and (f) a second transfer tube (24) coupled at one end to an upper portion of the decanting tube below the juncture tube and above the level of the downspout tube and having a lip (25) above the juncture between the second transfer tube and decanting tube and below the juncture tube and coupled at its other end to an upper portion of a mixing tube of an adjacent element of another, opposite side in the array.

3. The system of claim 2 wherein said second transfer tube extends downwardly from said mixing tube when said juncture tube is positioned at the top of said tube element.

* * * * *